(12) United States Patent
Borohovski et al.

(10) Patent No.: US 10,362,050 B2
(45) Date of Patent: *Jul. 23, 2019

(54) SYSTEM AND METHODS FOR SCALABLY IDENTIFYING AND CHARACTERIZING STRUCTURAL DIFFERENCES BETWEEN DOCUMENT OBJECT MODELS

(71) Applicant: Tinfoil Security, Inc., Mountain View, CA (US)

(72) Inventors: Michael Borohovski, Sunnyvale, CA (US); Ainsley K Braun, Sunnyvale, CA (US); Benjamin Sedat, Mountain View, CA (US); Angel Irizarry, Belmont, CA (US)

(73) Assignee: Tinfoil Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,391

(22) Filed: May 23, 2017

(65) Prior Publication Data
US 2017/0257390 A1 Sep. 7, 2017

Related U.S. Application Data

(63) Continuation of application No. 14/993,014, filed on Jan. 11, 2016, now Pat. No. 9,680,856, which is a (Continued)

(51) Int. Cl.
*H04L 29/06* (2006.01)
*G06F 21/57* (2013.01)
(Continued)

(52) U.S. Cl.
CPC ...... *H04L 63/1433* (2013.01); *G06F 16/2255* (2019.01); *G06F 16/951* (2019.01); *G06F 21/577* (2013.01); *H04L 67/02* (2013.01)

(58) Field of Classification Search
CPC .............. H04L 63/1433; H04L 67/02; G06F 17/30864; G06F 21/577; G06F 17/3033
See application file for complete search history.

(56) References Cited

U.S. PATENT DOCUMENTS 6,801,604 B2 10/2004 Maes et al.
7,028,306 B2 4/2006 Boloker et al.
(Continued)

*Primary Examiner* — Mahfuzur Rahman
(74) *Attorney, Agent, or Firm* — Fenwick & West LLP

(57) ABSTRACT

A security auditing computer system efficiently evaluates and reports security exposures in a target Web site hosted on a remote Web server system. The auditing system includes a crawler subsystem that constructs a first list of Web page identifiers representing the target Web site. An auditing subsystem selectively retrieves and audits Web pages based on a second list, based on the first. Retrieval is sub-selected dependent on a determined uniqueness of Web page identifiers relative to the second list. Auditing is further sub-selected dependent on a determined uniqueness of structural identifiers computed for each retrieved Web page, including structural identifiers of Web page components contained within a Web page. The computed structural identifiers are stored in correspondence with Web page identifiers and Web page component identifiers in the second list. A reporting system produces reports of security exposures identified through the auditing of Web pages and Web page components.

22 Claims, 6 Drawing Sheets

Related U.S. Application Data continuation of application No. 14/105,038, filed on Dec. 12, 2013, now Pat. No. 9,305,169.

(60) Provisional application No. 61/760,598, filed on Feb. 4, 2013, provisional application No. 61/738,592, filed on Dec. 18, 2012.

(51) Int. Cl.
  *G06F 16/951* (2019.01)
  *G06F 16/22* (2019.01)
  *H04L 29/08* (2006.01)

(56) References Cited

U.S. PATENT DOCUMENTS

| | | | |
|---|---|---|---|
| 8,301,800 B1 | 10/2012 | Champion | |
| 8,311,835 B2 | 11/2012 | Lecoeuche | |
| 8,639,560 B2* | 1/2014 | Kandogan | G06Q 30/0201 |
| | | | 705/7.11 |
| 9,720,569 B2 | 8/2017 | Gardner et al. | |
| 9,760,549 B2* | 9/2017 | Style | G06F 17/30492 |
| 9,922,089 B2* | 3/2018 | Style | G06F 17/30492 |
| 2002/0184373 A1 | 12/2002 | Maes | |
| 2003/0088421 A1 | 5/2003 | Maes et al. | |
| 2007/0061877 A1* | 3/2007 | Sima | H04L 63/12 |
| | | | 726/12 |
| 2008/0120283 A1* | 5/2008 | Liu | G06F 17/30923 |
| 2008/0148408 A1* | 6/2008 | Kao | G06F 21/577 |
| | | | 726/25 |
| 2009/0007253 A1* | 1/2009 | Chung | H04L 63/168 |
| | | | 726/12 |
| 2010/0186089 A1* | 7/2010 | Fu | G06F 21/53 |
| | | | 726/23 |
| 2011/0173589 A1* | 7/2011 | Guttman | H04L 43/50 |
| | | | 717/125 |
| 2011/0258532 A1* | 10/2011 | Ceze | G06F 17/30902 |
| | | | 715/234 |
| 2012/0072824 A1* | 3/2012 | Sherkin | G06F 17/30719 |
| | | | 715/234 |
| 2012/0072825 A1* | 3/2012 | Sherkin | G06F 17/30719 |
| | | | 715/234 |
| 2013/0254549 A1* | 9/2013 | Greene | G09C 5/00 |
| | | | 713/189 |
| 2014/0026027 A1* | 1/2014 | Style | G06F 17/30917 |
| | | | 715/234 |
| 2014/0108917 A1* | 4/2014 | Style | G06F 17/30492 |
| | | | 715/234 |
| 2014/0164352 A1* | 6/2014 | Denninghoff | H03H 9/02622 |
| | | | 707/711 |
| 2015/0067527 A1 | 3/2015 | Gardner et al. | |
| 2017/0257390 A1 | 9/2017 | Borohovski et al. | |

\* cited by examiner

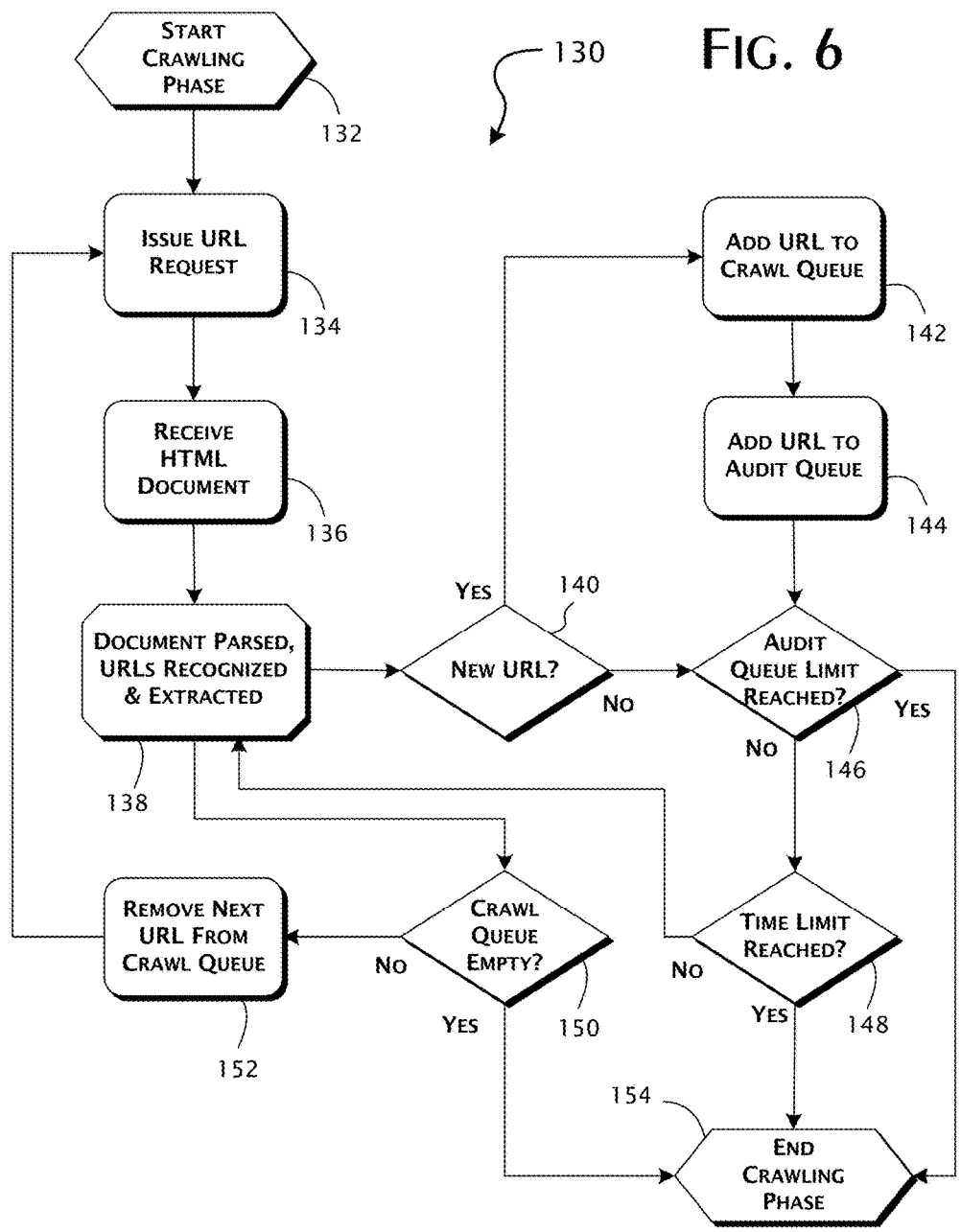

200

SYSTEM AND METHODS FOR SCALABLY IDENTIFYING AND CHARACTERIZING STRUCTURAL DIFFERENCES BETWEEN DOCUMENT OBJECT MODELS

This application is a continuation of U.S. patent application Ser. No. 14/993,014, filed on Jan. 11, 2016, which is a continuation of U.S. Pat. No. 9,305,169, filed on Dec. 12, 2013, which claims the benefit of U.S. Provisional Patent Application No. 61/760,598, filed on Feb. 4, 2013, and U.S. Provisional Patent Application No. 61/738,592, filed on Dec. 18, 2012, each of which is hereby incorporated by reference.

BACKGROUND OF THE INVENTION

Field of the Invention

The present invention is generally related to identifying structural differences, as potentially distinct from content differences, between possibly related documents and, in particular, to identifying relevant structural differences between documents realized by networked computer systems in the form of document object models for purposes of, among others, efficiently detecting and characterizing potential security vulnerabilities.

Description of the Related Art

The use of the World Wide Web, often simply referred to as the Internet or the Web, has grown over the recent years to the point where Internet access is an essential component of most all commerce, entertainment, social and business communications, and educational activities. Growth, both in terms of essential significance to users and frequency of use, is widely expected to continue for quite some time. Indeed, perhaps the most defining characteristic of the Internet is the ability to automatically and efficiently route vast amounts of data between users and Web site servers largely independent of the distributed geographic locations of the users and servers.

Unfortunately, perhaps the second most defining characteristic of the Internet is that virtually any presence on the Internet, whether present as a Web browser or Internet server, creates a security exposure. The threats to the client computer systems that execute Web browsers are generally well known. Anti-virus and other anti-malware client programs are available to protect client systems. Conversely, Internet servers and in particular Internet Web servers represent complex, often highly customized systems that are not generally amenable to generic protection schemes. Moreover, the content and function of the Web sites hosted by Internet Web servers are constantly subject to change as appropriate for the commerce, entertainment, social and business communications, and educational activities hosted by the site. As the site presence changes, the nature and extent of the site security vulnerabilities also change. Whether pursued for purposes of economic or privacy theft, industrial espionage, or vandalism, protecting Web sites against security exposures is an ongoing, difficult, and expensive imperative.

In general terms, most information exchanged over the Internet, including specifically the information provided by Web servers, is organized by data exchange protocols, site defining domains, and document paths. Together, these elements make up a Uniform Resource Locator (URL) or, more generally, a Uniform Resource Identifier (URI). The form and usage of URLs and URIs are standardized through the work of the World Wide Web Consortium (W3C; www.w3c.com), an international community that develops open standards to ensure the long-term growth of the Web.

For Web servers, information is exchanged using the HyperText Transfer Protocol (HTTP), also as standardized through the work of the W3C. Using the HTTP protocol for transport, Web information is exchanged in an encoded form as defined by the Hypertext Markup Language (HTML), again as developed through the work of the W3C.

The domain identifier portion of a URL is used to identify the site of a Web server. The domain identification may resolve to an actual, proxy, or virtual site somewhere accessible via the Internet, though typically one that is in some manner appropriate to respond to HTTP requests, among others. The path portion of the URL nominally provides a path-oriented selector of a particular document, typically representing a Web page, from a collection of such documents hosted by the domain identified Web server. Thus, a user can retrieve, on demand, most any identifiable document from a domain identified Web site.

In response to a URL request, information representing the corresponding Web page is transferred to the user. Typically, this Web page data is received and rendered by a client Web browser executed on a computer system local to the user. Although there are many different specific implementations, typically a rendering engine embedded within the client Web browser executes to decode and parse the received Web page HTML data into an internal data structure generically known as a document object model (DOM). From the DOM, the rendering engine then defines and transfers a graphical representation of the Web page into the local memory of the client Web browser display device. The client Web browser can also operate to capture user actions and selections, including data entered through Web page forms, and related information designated for capture by the HTML and enscripted coding of the Web page. The captured data is then transferred back to the Web site server or other designated computer system using a HTTP defined transfer method.

A Web site can be as simple as a single, statically defined Web page. Other sites can host Web page document collections that range, in effect, from hundreds to tens of thousands or even millions of distinct Web pages, all of which can be transferred on demand to a client browser. Conventionally, such larger sites, sites hosting frequently changing content, user interactive sites, and others subject to specialized needs, will utilize Web servers with a dynamic Web page generation capability. Dynamic page generation systems typically operate in near real-time to construct Web pages in response to URL-defined requests. Information captured from user actions and inputs can be also used to dynamically define or influence the constructed appearance and content of a generated Web page. This also allows information produced or gathered from other sources, perhaps other users or third-party data feeds, to be dynamically composed into the generated Web pages. Since, these Web pages are dynamically generated in direct response to a client Web page request, the generated Web page will desirably present the most current available information. Even as between simultaneously received, otherwise identical requests from different users, a Web page generator can produce different instance Web pages based on external and user specific information, such as inferred geographic location, preferred language, expressed interests, past browsing history, and other similar factors determined in relation to the Web page request as received.

Although technically complex, the access barrier to receiving Web pages and providing for the return of user data is low. Most any current computer system, network appliance, or other client device capable of Internet access can interact with remote sites through HTTP requests and HTML content-based responses. Given that the HTTP protocol is conventionally implemented on a layered stack of network communications protocols, a similarly low barrier exists for client and remote server interactions using any of these other protocol layers. Often, highly interactive Web sites, sites that offer enhanced or specialized services, and other similarly complex Web sites will often utilize elements or functions provided by these other communication protocol layers.

From a security point of view, every host server operation executed and every protocol layer used to receive and respond to a Web browser URL request represents a risk of an exploit that could compromise the operation or integrity of the Web server computer system. These risks can range, in various forms, from denials of service to interference with the proper operation of different elements of the Web server computer system. In addition, these risks include breaches that allow injection of corrupting operations or outright access to sensitive or confidential information held by or accessible from the Web server system.

Consequently, a need exists for a system and methods for continuously ensuring that security exposures in any Web server system can be identified and managed before they can be exploited without imposing excessive performance penalties or altering the current low barrier to access enjoyed by users.

SUMMARY OF THE INVENTION

Thus, a general purpose of the present invention is to provide an efficient security auditing platform and methods for ensuring that security exposures in a target Web site are identified and characterized before they may be exploited.

This is achieved in the present invention by providing a security auditing computer system operative to efficiently audit for and report on security exposures identified in a target Web site hosted on a remote Web server system. The auditing system includes a crawler subsystem that constructs a first list of Web page identifiers representing the target Web site. An auditing subsystem selectively retrieves and audits Web pages based on a second list, based on the first. Retrieval is sub-selected dependent on a determined uniqueness of Web page identifiers relative to the second list. Auditing is further sub-selected dependent on a determined uniqueness of structural identifiers computed for each retrieved Web page, including structural identifiers of Web page components contained within a Web page. The computed structural identifiers are stored in correspondence with Web page identifiers and Web page component identifiers in the second list. A reporting system produces reports of security exposures identified through the auditing of Web pages and Web page components.

An advantage of the present invention is that it provides a robust security auditing platform for efficiently acquiring Web pages from a target Web site for auditing, selectively subjecting pages and page components to a suite of audit tests to identify and characterize security exposures, and for reporting the results. The audit tests performed are particularly probative of actual security exposures, since Web pages can and preferably are acquired by the platform from a network location external to the target site.

Another advantage of the present invention is that the security auditing platform is implemented and operates independent of any particular technologies used in the implementation of the target Web site. That is, the security auditing platform of the present invention does not require any specific prior knowledge of the site structure or implementing components used by the target Web site in order to identify and characterize security exposures present in the target Web site. Also, the present invention does not require any specific internal modifications of a target Web site to enable the security audit of that Web site.

A further advantage of the present invention is that the security auditing platform operates to discretely identify Web pages and Web page components that have, to a high degree of certainty, the same security exposures. Once a Web page or page component has been audit tested, subsequent risk matched pages or components do not need to be subjected to the full suite of audit tests. The security exposures of the initial tested Web page or component is assigned to each risk matched Web page or component.

Still another advantage of the present invention is that the security auditing platform is highly efficient and expedient in the auditing of external targeted Web sites. By the selective identification of security exposures shared by Web pages or components, the present invention implicitly provides test coverage for an entire target Web site without explicitly auditing every Web page. This selective identification is generally insensitive to ordinary content changes. Therefore, generation of a point in time snapshot of all site Web pages is not required.

Yet another advantage of the present invention is that audit execution against a target Web site does not interfere with the normal operation of the target Web site, both in terms of the ability to serve Web pages to other users or in how such other users interact with the target Web site. Thus, audit executions against a target Web site can be run at any time. Executions can be run autonomously based on a pre-defined schedule, continuously, or on-demand, such as may be appropriate following a significant internal modification or update of a target Web site.

BRIEF DESCRIPTION OF THE DRAWINGS

FIG. 6 provides a flow diagram describing a site crawling operational phase of a process of characterizing structural differences between document object models as implemented in a preferred embodiment of the present invention.

DETAILED DESCRIPTION OF THE INVENTION

Figure 1:
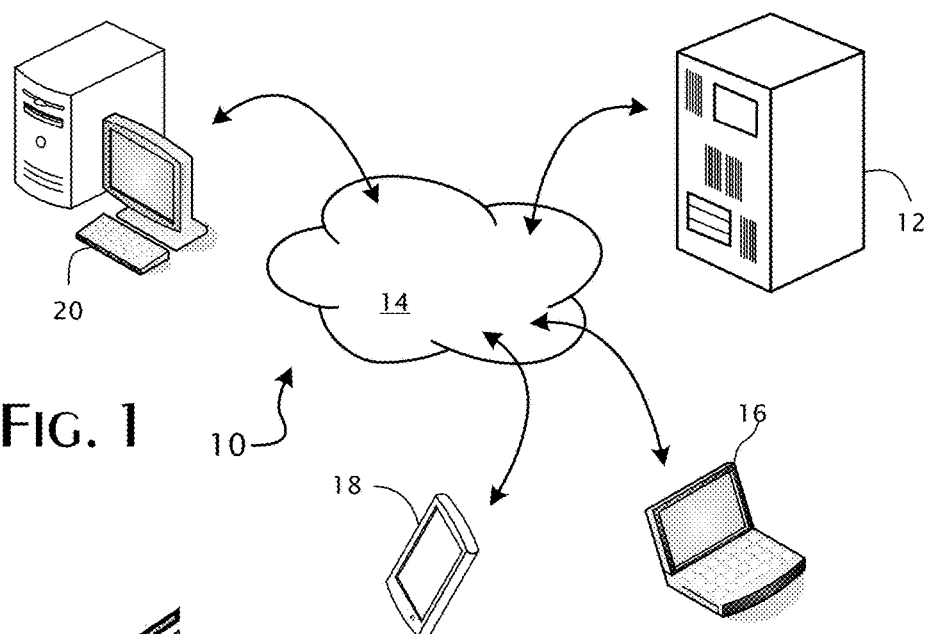
FIG. 1 illustrates a preferred network operating environment for a preferred embodiment of the present invention.

The preferred execution environment for the present invention is generally shown in FIG. 1. A conventional Web server 12 operates to host one or more Web sites that are generally publically accessible through a network, such as the Internet 14, that allows users to interact with the Web site through various client devices, such as personal and notebook computers 16 as well as tablets, netbooks, and smart phones 18. The Web server 12 may be implemented as a conventional computer server system, a geographically distributed set of computers, or functionally virtualize through hosting on a platform as a service (PAAS) system.

Nominally, the interactive transactions between users and the Web site are secure. However, due to the complexity and nature of the various components and technologies utilized in the creation and operation of the Web site, latent security exposures will exist and, potentially, may be exploited by a knowledgeable user of a client device 16, 18. A computer system 20 implementing the security auditing platform of the present invention is utilized to examine the Web site for security exposures. Preferably, this computer system 20 is sited as an ordinary client relative to the Web server 12. The basic aspects of the computer system 20 may also be implemented using conventional techniques as a single, distributed or virtualized computer system.

In accordance with the present invention, the computer system 20 implements a security auditing platform that can be operated to target for auditing the Web site hosted by the Web server 12, as well as any number of other, typically distinct Web sites. Such auditing is typically performed at the request of the Web site domain owner, Web site operator, or Web server administrator, individually or collectively referred to as the interested domain entity. Auditing of a particular Web site may be performed on a scheduled or periodic basis, continuously, on-demand by the domain entity, or any combination thereof. The auditing process performed in accordance with the preferred embodiments of the present invention is substantially autonomous and proceeds through a progressive and adaptive scan of the Webpages generated by the Web site server 12. This auditing process is responsive to the content and context of the Web pages received, particularly including dynamically generated Web pages, to enable a thorough exploration of the many different Web pages that may be generated as part of the collective Web site.

Figure 2:
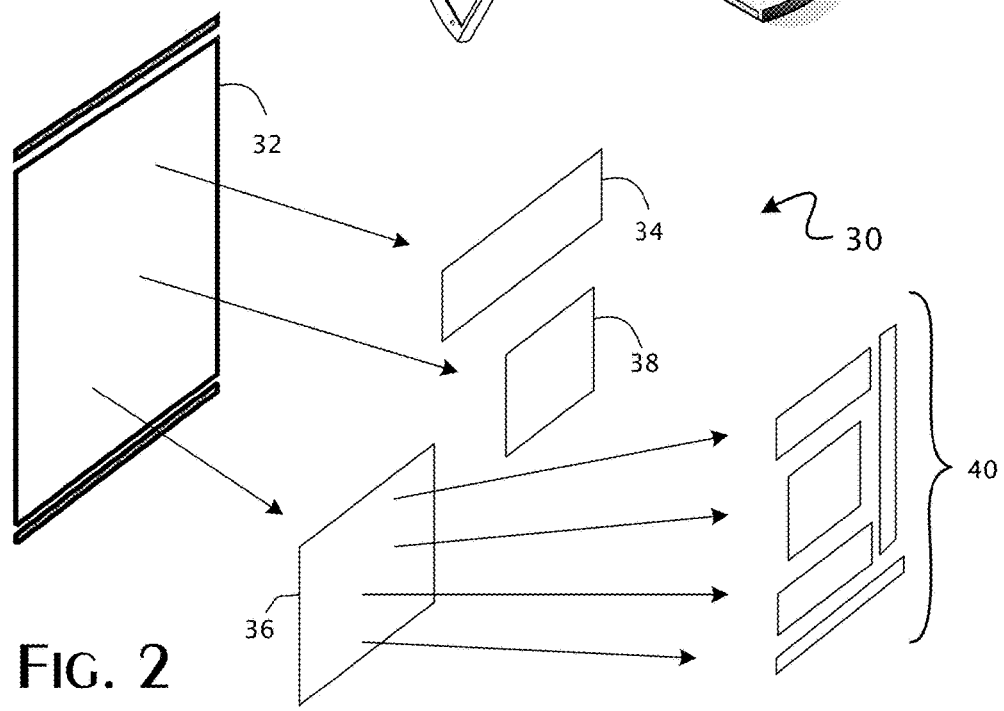
FIG. 2 provides a representative view of the composition of a Web page as evaluated by a preferred embodiment of the present invention.

Referring to FIG. 2, the preferred embodiments of the present invention consider a Web page 30 as composed of one or more potentially distinguishable components. As generally depicted from the vantage point of a user, a Web page 32 may for example include divisions representing a header 34, content box 36, and ancillary content 38, each potentially a distinguishable component. These divisions, in turn, may be sub-divided further into smaller potentially distinguishable components 40. For purposes of the present invention, a distinguishable component is a divisible portion of a Web page that provides or performs a closely related function, such as presentation of a menu, a block of text or other similar content, a form, a drawing or graphic surface, or an advertisement banner, among others. Whether any particular part of a Web page is a distinguishable component will depend on content and context, as will be discussed below in connection with the preferred embodiments of the present invention.

Figure 3:
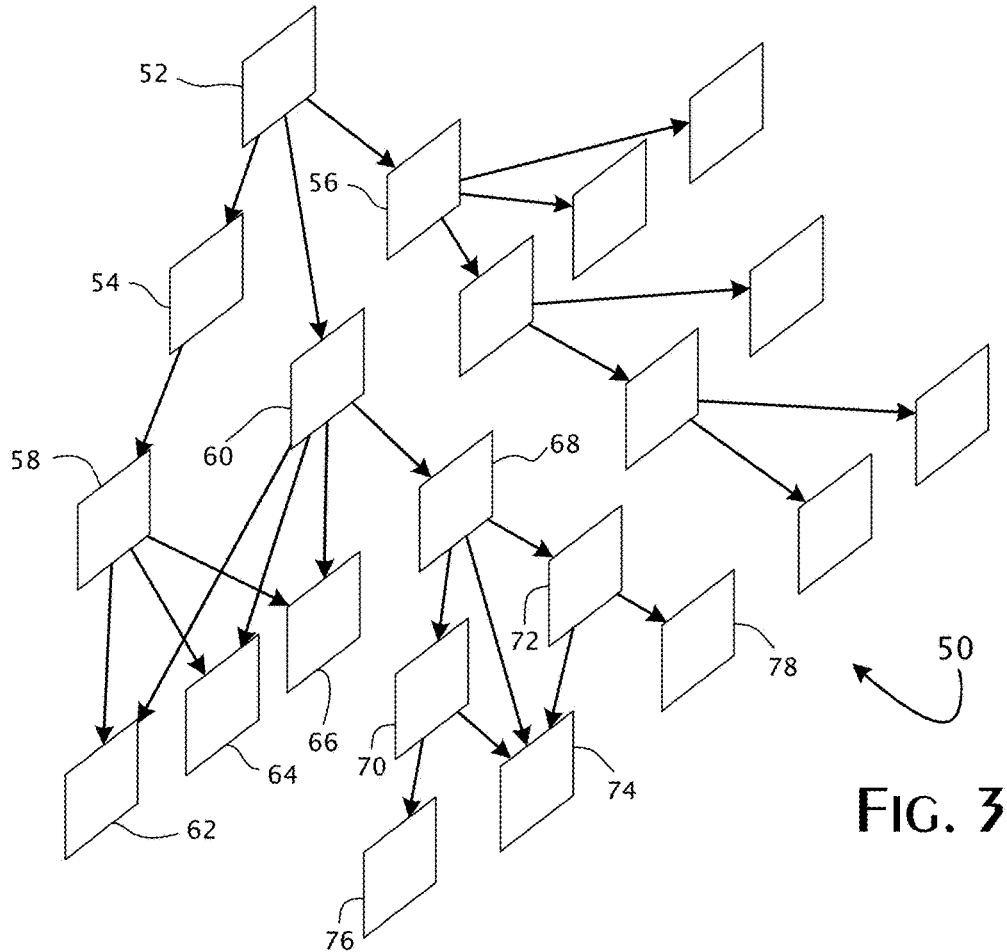
FIG. 3 is a schematic representation of an illustrative hierarchically related data structure defining, for example, the relationship of Web pages within a Web site, as considered in relation to a preferred embodiment of the present invention.

FIG. 3 provides a representation of a data structure 50 that can be used to illustrate several relationships relevant to the present invention. The data structure 50 can be viewed as representing the hierarchical relationship among Web pages within a Web site. A root or home page 52 contains content that includes embedded URIs that identify and functionally link to other pages 54, 56, 58, et seq. within the Web site. The distinct pages 58, 60 may each embed links to pages 62, 64, 66. While links in pages 58, 60 may reference the same corresponding pages 62, 64, 66, these links may not be identical. Rather, for example, links to page 64 may reference different named anchors within the page 64. Other information may also be functionally appended to or provided with a link in requesting the Web pages 64. For purposes of the present invention, an embedded link is considered to be effectively identical to another where the link references the same structural document location within the logical collection of documents that represent the Web site, provided such can be determined from an analysis of the embedded link.

The data structure 50 can also be viewed as representing Web page frames and Web page elements that, when composited together, will represent a complete Web pages. For example, the Web page frame 52 may be composited with the Web page elements 54, 56, 58, 60, 62, 64, 66 subject to the HTML encoding of the Web page as interpreted by the layout engine embedded within a client Web page browser. Some elements, such as commonly used graphic elements 62, 64, 66, may be referenced and used repeatedly in the compositing process. In similar manner, Web page frames 68, 70, 72 may each be composited with an element 74. Relevant to the preferred embodiments of the present invention, this Web page element 74 may be a menu, a data entry form, an interactive advertisement block, or the like. Preferably, a Web page element that accepts data entry by or on behalf of a user may be treated as a Web page component. Such possible Web page components may, in turn be composed of or include other possible Web page components.

Notably, any of these Web page components, including the Web page frame 52 itself, may be dynamically generated by the Web site in response to the Web page request. Typically, dynamic generation is implemented by a real-time merger of content from various sources with predefined templates directly or indirectly referenced by the Web page request. Often, the templates will provide the source references used to select the content for server-side merging. Scripts embedded in the Web page and executed in a client browser may also operate to merge subsequently requested content into the Web page. Whether the Web page is statically or dynamically generated and whether content is merged client-side or server-side, the nature of the Web page, for the purposes of the present invention, remains the effective composite of a Web page frame 52 and any number of embedded Web page components. In the presently preferred embodiments of the present invention, each of these possible Web page components is identified for auditing as a discrete, auditable Web page component.

Finally, a portion of the data structure 50 can be viewed as representing a conventional document object model as constructed in a client browser. A conventional document object model is constructed as a simple tree of nodes, with each node other than the root node having a single parent node and any number of child nodes. Ignoring items 54, 58, 60, et seq., the document root element 52 effectively corresponds to the document object encoded by the <HTML> tag. As generally shown, a child element 56 may represent the object encoded by the <BODY> tag, with further child object representing divisions or other objects as parsed from the HTML encoded Web page. The well-defined structure of the document object model allows for an equally well-defined programmatic ability to traverse the model in both up and down directions by programs executed in or with access to a document object model held within a client browser context.

Figure 4:
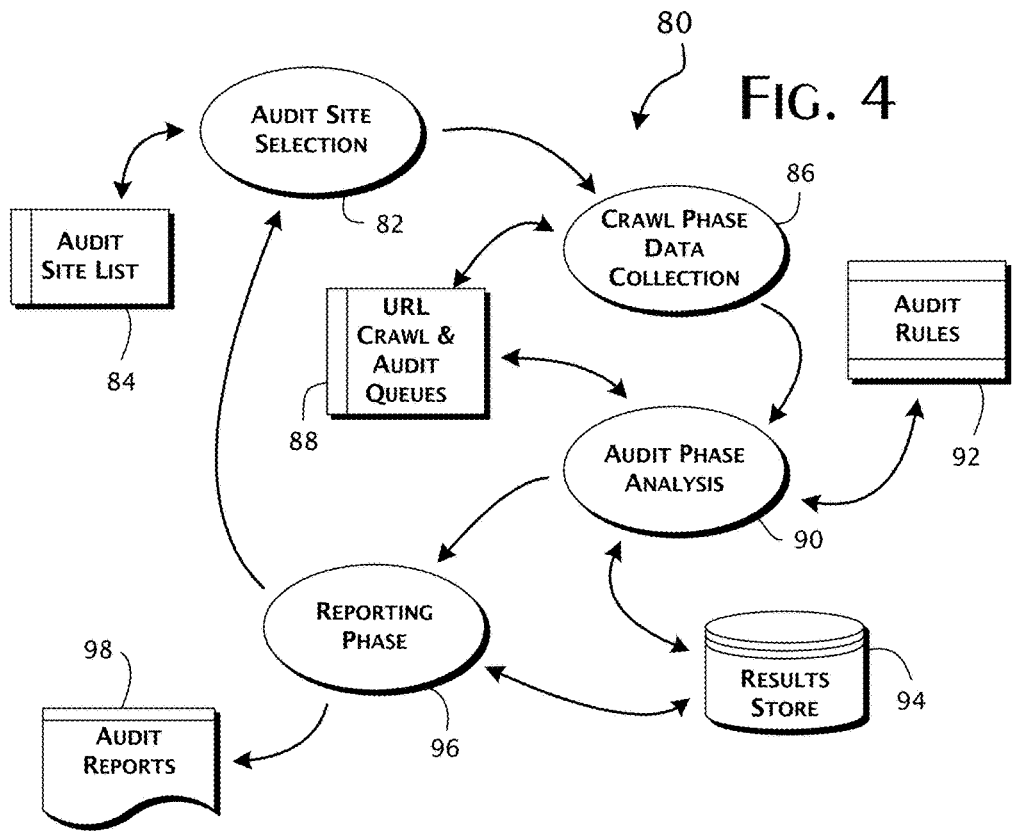
FIG. 4 provides an overview of a process of characterizing structural differences between document object models as implemented in accordance with a preferred embodiment of the present invention.

FIG. 4 provides an overall view of a security audit process 80 executed by the platform 20 in accordance with a preferred embodiment of the present invention. Process execution generally begins with the selection 82 of a target Web site for auditing. Information identifying target Web sites is preferably administratively maintained in an audit site list 84. Selection of any particular target Web site may be qualified by timing or other criteria maintained in or in relation to the information stored by the audit site list 84.

Once a site has been selected 82, a Web site crawling phase 86 begins. By selectively retrieving and parsing pages from the target Web site, a general representation of the overall site can be constructed. In the preferred embodiments of the present invention, this representation is realized as a list of URIs collected into URL crawl and audit queues 88. Preferably, execution of the crawl phase seeks to obtain at least a representative sampling of the Web pages that collectively make up the target Web site. The extent of the sampling may be qualified by various criteria and, in the presently preferred embodiments, by crawl duration and by a limit on the number of URIs collected.

Following the crawling phase 86, an audit phase 90 is executed. The crawl URIs are used generally as seeding Web site page identifiers. The audit phase execution involves the selective retrieval and parsing of Web pages, discriminating whether a retrieved Web page or Web page component identified from within the Web page corresponds to a Web page or component that has been audited, and processing new Web pages and components through a security audit procedure. A set of audit rules 92 is preferably used to guide the security risk identification and characterization analysis, with the detailed finding produced being persisted to a results store 94. Identifications of the Web page or component audited appropriate for use in discriminating similarities to other possible Web pages and components are preferably stored in the URL crawl and audit queues 88.

Generally following the conclusion of the auditing phase 90 for a given target Web site, a reporting phase 96 is executed. By accessing the information persisted to the results store 94, comprehensive and detailed audit reports 98 can be generated autonomously, according to a preset schedule, or on-demand as desired by the domain entity.

Although the security audit process 80 has been described above as a sequential process, executions of the process 80 relative to different target Web sites may be executed asynchronously and in parallel. In addition, relative to a single target Web site, the various phases 82, 86, 90, 96 may be executed in a parallel pipeline mode to minimize the total real-time required to complete an instance of the security audit process 80.

Figure 5:
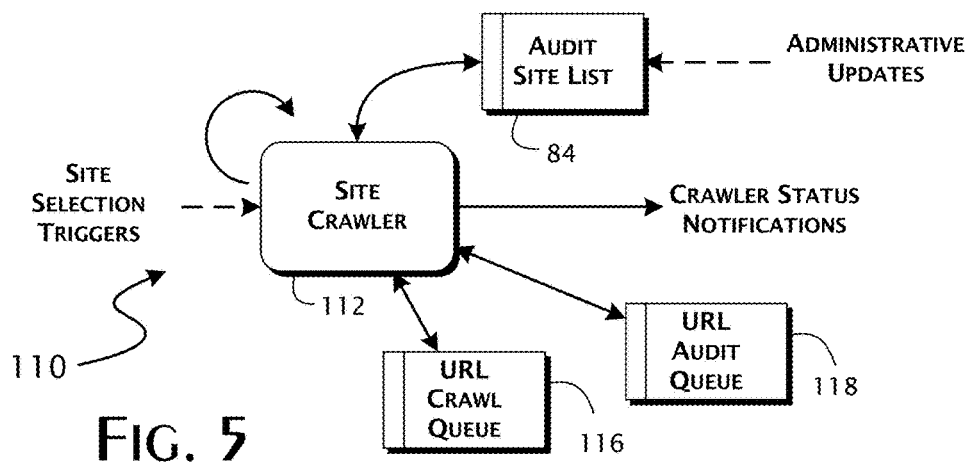
FIG. 5 is a block diagram of a site crawler computer subsystem as implemented in a preferred embodiment of the present invention.

A preferred implementation of a site crawler processor 110 is shown in FIG. 5. The site crawler processor 110 is preferably implemented as part of the security audit platform 20. A site crawler engine 112 executes initially in response to site selection triggers originated from an execution of the target Web site selection phase 82. A site selection trigger preferably identifies a record instance in the audit site list 84. This audit site record is preferably externally administered to include an initial URI of a target Web site and optionally parameters to be used by the site crawler engine 112. These parameters preferably include a URL crawl queue size and an interval time defining an allowed crawl duration. Other parameters, such as a minimum time between Web page requests, may be also stored as part of the audit site record.

Once initialized, the site crawler engine 112 requests and then parses received Web pages. URLs identified through parsing are added to the URL crawl queue 116. These queued URLs are then drawn down by the site crawler engine 112 and used as the basis for subsequent Web page requests. The initial site selection URL and, preferably, a sub-selection of the URLs parsed from retrieved Web pages are added to a URL audit queue 118. This sub-selection may be based on any of number of fixed and variable criteria. One such fixed criterion may be a maximal depth limit relative to the initial site selection URL. Variable criteria may include domain name aliases that are to be considered as equivalent to the domain specified in the initial site selection URL, a list of URLs to be excluded from the crawl operation, a site specific crawl depth limit, and a factor to be used in the sub-selection of URLs to be added to the URL audit queue 118. These variable criteria, if utilized, are preferably defined administratively and provided as part of the corresponding audit site record. Ongoing progress and a final crawler status notifications are preferably issued.

Further details of the procedural security scan operation 130 of the site crawler engine 112 are provided in relation to FIG. 6. Beginning 132 from the initial site selection URL, the site crawler engine 112 issues 134 a corresponding URL request. On receipt 136 of the corresponding Web page, the body portion of the HTML encoded content is parsed 138 to identify, extract, and index embedded URIs for later security auditing. Each extracted URL is evaluated 140 against applicable fixed and variable criteria, and whether an identical URL has already been added to the URL crawl queue 116. If the URL is allowed and new, the URL is added 142 to the URL crawl queue 116. In the presently preferred embodiments of the present invention, all such URLs that are also added 144 to the URL audit queue 118.

Alternately, a variable criteria defining, for example, a distribution factor may be applied to sub-select whether the URL is sufficiently different from URLs already present in the URL audit queue 118. In addition, or as a further alternative, a structural differencing operation may be implemented to screen Web pages for similarity matches against Web pages previously retrieved in this scan operation 130. This differencing operation is preferably substantially the same operation as described below in connection with the preferred embodiment of the audit process. By exclusion of Web pages based on the extent of similarity determined, the URL audit queue 118 will collect a more varied set of Web pages that more likely represent a larger representative sample of the Web site.

Termination criteria for the security scan operation 130 are then checked. In the presently preferred embodiments, a check is made of whether a URL audit queue depth has been reached 146 or whether the security scan time has elapsed 148. If both checks return false, the next URL parsed from the current Web page is considered for addition to the URL crawl and audit queues 116, 118. Alternately, these checks may be performed only once all of the URLs parsed from a Web page are considered for addition to the queues 116, 118. The crawl queue 116 is then checked 150 for remaining queued URLs. If not empty, a URL is dequeued 152 and used in a URL request issued 134 to the target Web site.

In this manner, a recursive examination of Web pages is performed until effectively all Web pages constituting the target Web site have been scanned, the time allotted for the scan has elapsed, or the desired maximum number of auditable Web pages have been collected. When any one of these criteria 146, 148, 150 has been met, the instance crawling phase terminates 154.

Figure 7:
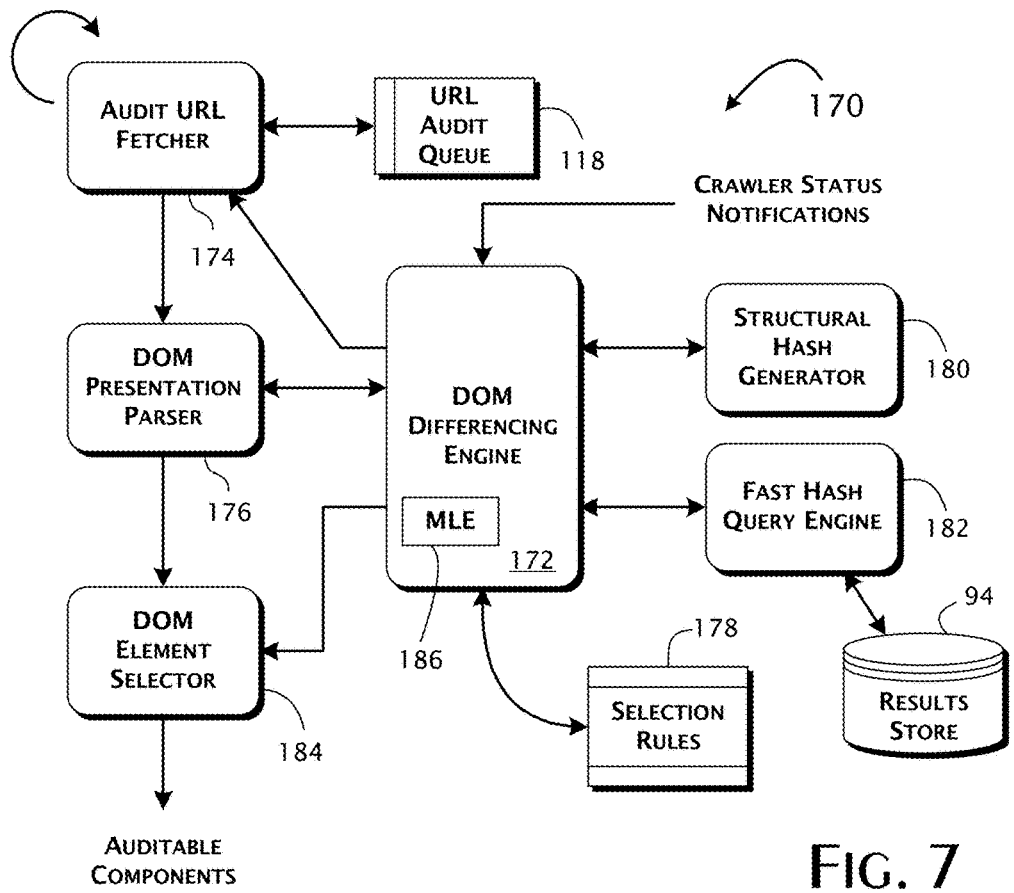
FIG. 7 is a block diagram of a document object model differencing computer subsystem as implemented in a preferred embodiment of the present invention.

A preferred implementation of a site audit selection processor 170 is shown in FIG. 7. In response to a URL audit queue 118 instance becoming available, the site audit selection processor 170 executes to determine whether a retrieved Web page or any contained Web page component should be scheduled for auditing. When enabled generally in response to a DOM differencing engine 172, an audit URL fetcher 174 operates to dequeue a URL from the URL audit queue 118, issue a corresponding Web page request to the target Web site, and receive the corresponding Web page content. This content is provided to a DOM presentation parser 176 that executes to parse and initially construct a conventional document object model representation of the Web page content. Under the control of the DOM differencing engine 172, the DOM instance is further processed and, as needed, annotated or modified.

These further operations are, in accordance with the preferred embodiments of the present invention, performed to determine whether the DOM tree or any DOM sub-trees, corresponding to the Web page as a whole and constituent Web page components, are to be sub-selected for auditing. The outcome of this determination may be that all auditable aspects of the DOM tree have, in effect, been considered. In this case, the DOM differencing engine 172 directs the DOM presentation parser 176 to discard the DOM instance and then enables the audit URL fetcher 174 to retrieve the next Web page.

For a DOM instance that requires further processing, the DOM differencing engine 172 executes against the DOM instance to find and mark each of the auditable elements present within the DOM instance. In the presently preferred embodiments of the present invention, a pointer to the root of each sub-tree is added to a list of auditable elements, held by the DOM differencing engine 172. Alternately, the DOM instance may be annotated with markers that identify the auditable elements. These auditable elements, for purposes of the present invention, correspond to the distinguishable elements of a Web page that are susceptible to being or containing security exposures. In the preferred embodiments of the present invention, these elements correspond to links, forms, headers, cookies, among other possible elements of a Web page. Preferably, a list of selection rules 178 is maintained administratively to identify distinguishable elements. This list 178 may be explicit in terms of DOM element types. Alternately, the list 178 may contain rules that, upon evaluation against a specific DOM instance, produces identifications of distinguishable element instances. This evaluation may be performed by conditional logic or through the use of an inference engine trained on a knowledgebase of known security risks.

For each of the distinguishable elements found and marked, the DOM differencing engine 172 executes a structural hash generator 180 to create a hash value having a defined uniqueness relative to each corresponding distinguishable element. These values are checked via a fast hash query engine 182, executed against a persistent store 94 of hash values corresponding to distinguishable elements that have already been subjected to security auditing. Where a matching hash value is found, the corresponding distinguishable element will not be subjected to security auditing. Rather, the component is assigned the security risks and issues associated through the matching hash value and a corresponding record is recorded in the results store 94. Conversely, where no matching hash value is found, the DOM differencing engine directs the selection of the corresponding DOM component by the DOM component selector 182 for pass through for auditing.

Figure 8:
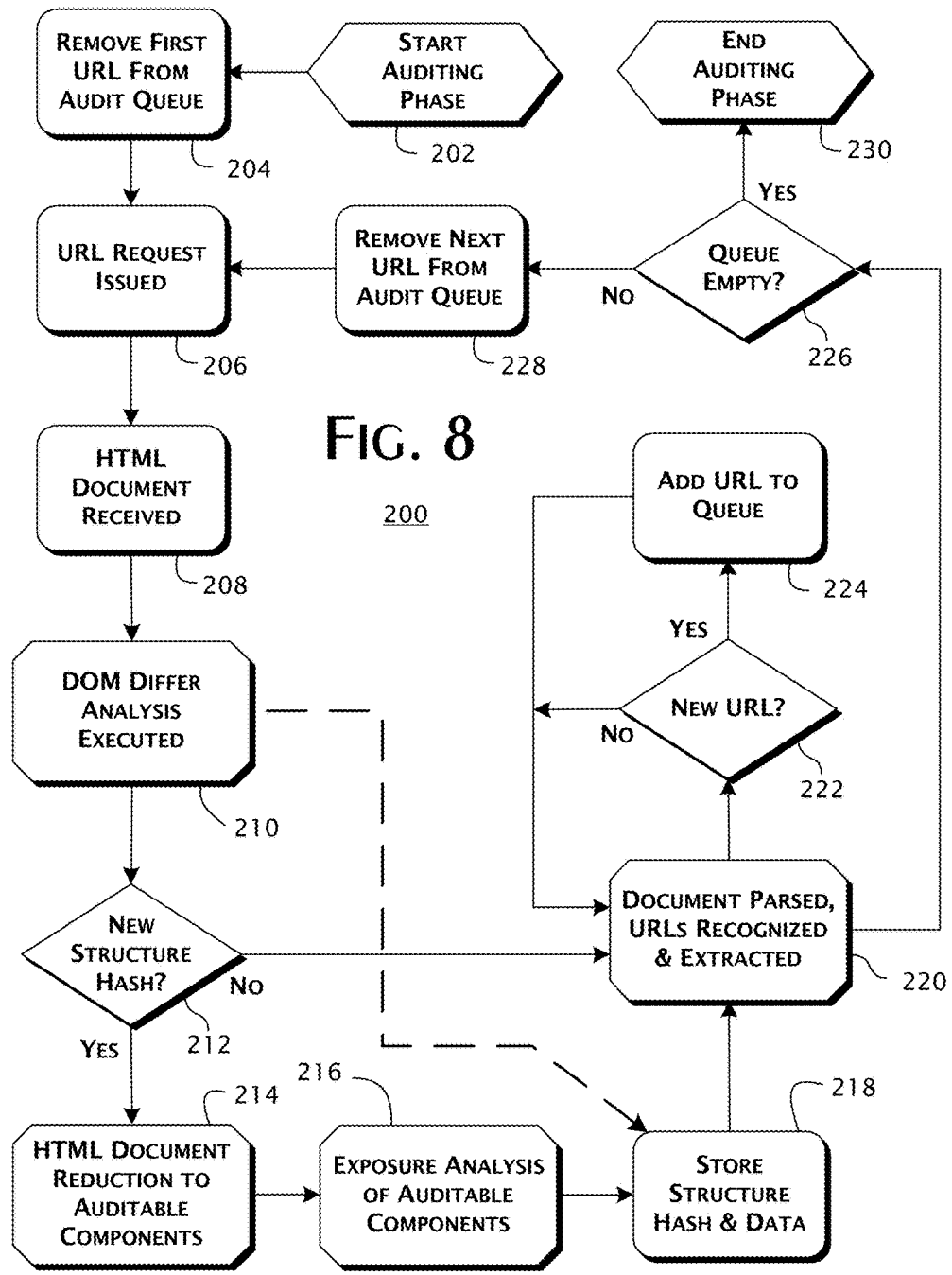
FIG. 8 provides a flow diagram describing an audit operational phase of a process of characterizing structural differences between document object models as implemented in a preferred embodiment of the present invention.

The auditing phase procedure 200, as shown in FIG. 8, further details the operation of a preferred implementation of the site audit selection processor 170. This auditing phase begins 202 with the presentation of a URL audit queue 118. The initial URL is dequeued 204 and a corresponding Web page request 206 is issued. On receipt of the corresponding Web page content 208, the DOM differencing engine 172 initiates an analysis 210 of the corresponding constructed DOM instance. Preferably, the DOM differencing engine 172 operates directly against the DOM instance by traversing the tree structure to initially locate leaf elements of the DOM tree. In the presently preferred embodiments of the present invention, leaf elements correspond to the nodes of the DOM tree that have exactly zero children. When a leaf element is found, the DOM differencing engine 172 computes a hash value for the corresponding DOM element. This hash value is computed in a manner intended to have a defined uniqueness that will be the same for other DOM elements that, to a high degree of confidence, share the same type and measure of security vulnerabilities. In accordance with the present invention, the hash computation is performed without required examination or other access to any underlying Web page generation templates that may have been used in the production of the Web page. The hash value is computed with resort only to the Web pages received.

The construction and use of hash values in accordance with the present invention is superficially similar to the so-called Merkle-tree hash function, as described in U.S. Pat. No. 4,309,569. In conventional application, the Merkle-tree hash function is used as a mechanism enabling the secure verification of data contained within a set of data blocks. Given that nodes of a tree structure can be associated with respective data blocks, application of the Merkle-tree function provides for the annotation of every tree node with a security label. For any given node, this label is computed as a secure hash of the node data block and the hash label of each child node. To be effective, the full contents of every data block is hashed and included in the labeling of the Merkle-tree nodes. The hashing function used must be cryptographically secure with a sufficient digest space to preclude collisions as a practical matter.

In the preferred embodiments of the present invention, the hash value computation is predicated on the HTML element type of a DOM element combined with a factor derived from the names, values, and number of associated HTML attributes. Specifically, in the presently preferred embodiments, the name of the DOM element, such as 'a', 'img', and 'body', is concatenated with the number of HTML attributes associated with the DOM element. In the presently preferred embodiments, the name and type of the associated HTML attributes are not considered. By way of example, a leaf element, corresponding to an embedded URL link, can be represented as:

<a class='style2' href='#'>Link text</a>

In the operation of the DOM differencing engine 172, this leaf node would be processed to produce the clear text string "a|2", corresponding to a HTML element type name of "a" and the two associated attributes. The names and values of the attributes are not currently used. The string is then hashed utilizing a fast hashing algorithm. Suitable algorithms exist for the SHA-1, MD5, and AES hashing functions, among others. The SHA-1 hash function is used in the presently preferred embodiments of the present invention.

From each leaf element, the DOM differencing engine 172 traverses up the DOM tree to the corresponding immediate parent element. The DOM differencing engine 172 preferably computes a hash value based for that DOM element based on the HTML type name of that element, the type, value and number of associated attributes, and the hash values of each immediate child element of that DOM element. In the presently preferred embodiments of the present invention, the type and value of the associated attributes are not used. Thus, for example, a DOM sub-tree can be represented as:

```
<div class="container">
    <a class="button" href="login.php">Login</a>
    <img src="lock.png"></img>
</div>
```

Preferably, the DOM differencing engine 172 would first assign the first leaf element of this tree the hashed value of "a|2", or HASH('a|2'). The second leaf element would be assigned the value HASH('img|1'). The parent node is then preferably assigned the value:

HASH("div|1|HASH('a|2')|HASH('img|1')")

The DOM differencing engine 172 recursively repeats this procedure as it traverses up the DOM tree from every leaf element to the DOM tree root. At the conclusion of the process, every DOM element will have an assigned hash value constructed to represent the node to which the value is assigned and all of the sub-tree nodes that depend from that DOM element. The DOM tree root will have a hash value that effectively describes the entire DOM tree.

In accordance with the present invention, construction of hash values in the manner described provides a mechanism to recognize a meaningful identity between non-identical Web pages. The computed hash values represent a defined degree of uniqueness by reflecting the structure and organization of Web pages such that, to a high degree of confidence, a match of two hash values originating from different Web pages of a target Web site indicates that corresponding portions of both Web pages will have the same security exposures both in terms of type and measure. Thus, as between two Web pages or Web page components that are by conventional appearance quite dissimilar, the present invention enables identities relevant to the identification of security exposures to be readily recognized. Unnecessary audit executions are thereby avoidable, resulting in a substantially more efficient examination of the security exposures that may exist in a target Web site.

In an alternate embodiment, the DOM differencing engine 172 operates to recognize certain structural aspects of the DOM being processed. Specifically, when evaluating DOM elements in the generation of hash values, the DOM Differencing engine 172 will recognize the occurrence of redundant, inconsequential, and presentation data dependent elements. Typical of redundancies, and typical of dynamically generated Web pages, multiple nested levels of DIV and similar elements may occur in an expansive manner of specifying multiple attributes. Where each nested element contains only a single consequential element, the DOM differencing engine can preferably implement a strategy of logically collapsing the set of nested DOM nodes to a single node with multiple attributes for purposes of computing the node hash value. For repeated or nested DOM elements that specify no additional attributes and do not contain renderable or executable content, the DOM differencing engine 172 preferably implements a strategy to effectively skip such inconsequential elements relative to the computation of the hash values.

Where the DOM effectively defines multiple contexts that are presentation data dependent, the DOM differencing engine 172 preferably implements a strategy to recognize the different contexts in the hash values generated. One preferred strategy is to select a single representative context and generate hash values with respect to nodes renderable with respect to that context. Another strategy is to compute alternate hash values for the nodes renderable in each of the different contexts. These strategies may be combined with the strategies for handling redundant and inconsequential elements and, optionally, by a tolerance value defined and used to limit the number of nodes that can be omitted or that may be counted either for the entire tree or relative to the dependent subtree. The resulting compact root hash may be stored and used in place of or in addition to the root hash value computed as described relative to the presently preferred embodiments.

Another preferred strategy is to analyze and identify the one or more structurally significant subtrees that contain the Web components that will be audited in the security audit phase 90. The boundary of such a subtree may be identified by the existence of one or more nesting DOM elements that provide little or no structural significance. A full or compact hash value corresponding to the subtree root node is preferably stored in addition to the complete root hash value. Preferably, computation of the full and any compact hash values continues for the full tree represented by the DOM. As a result, the computed set of hash values may include the full and compact hash values for the DOM and the full and compact hash values for structurally significant DOM subtrees.

Referring again to FIG. 8, once the DOM tree has been assigned hash values, the result store 94 is queried for hash matches. If the hash value assigned to the DOM root element is found, then audit processing of the Web page is considered as unnecessary. A record is created in the result store 94 for the Web page and assigned the security exposures associated with the matched Web page.

The Web page is then parsed to recognize and extract embedded URLs 220. For each extracted URL, the URL audit cache 118 is examined 222 and, if new, is added 224 to the URL audit cache 118. A check is then made to determine if the URL audit queue 118 is empty 226 and, if not, to dequeue the next URL for use in requesting 206 a next Web page from the target Web site. If the queue 118 is empty, the auditing phase is complete 230.

Figure 9:
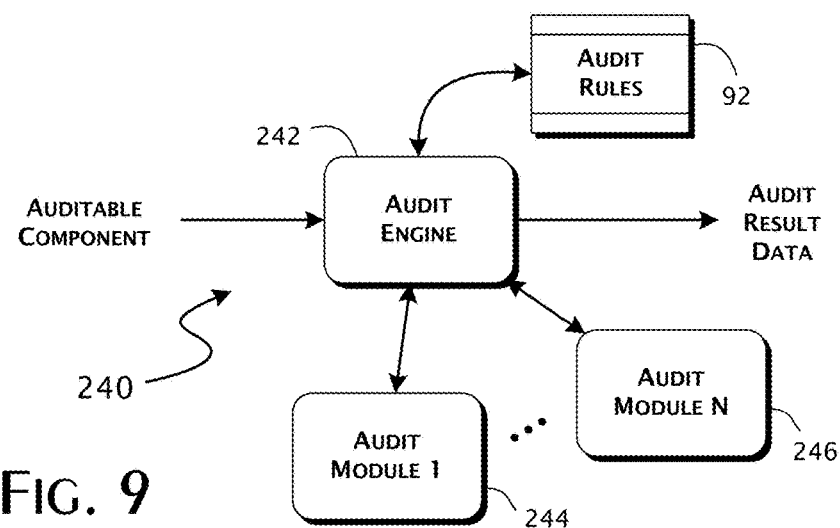
FIG. 9 is a block diagram of an auditing computer subsystem as implemented in a preferred embodiment of the present invention.

A preferred implementation of an audit processor 240 is shown in FIG. 9. Auditable components are provided from the DOM component selector 182 to an audit engine 242. In addition, the DOM component selector 182 provides supplementary aspects of the Web page content to the audit engine 242 in support of the examination of the Web page component for purposes of identifying and characterizing security exposures. These supplementary aspects include the information provided as part of the Web page that may affect, influence, or qualify how a user may interact with the Web site through the instance Web page or component. In the presently preferred embodiments of the present invention, the supplementary aspects include header metadata, scripts, and identifiers, scripts embedded in other portions of the Web page, requests for and manipulations of cookies and similar data stored by the client browser, and contextual metadata effectively hidden in the Web page content, such as the names assigned to variables and other elements.

The audit engine 242 preferably performs an analysis of the provided Web page component within the context established by the supplementary aspect information. This analysis is driven from a set of audit rules 92 that, in the preferred embodiments of the present invention, specify sets of conditions that, if satisfied, identify the set of audit modules 244, 246 that will further be executed against the Web page component. Preferably, these audit modules 244, 246 are individually specialized to perform security diagnostic tests on Web page components. The specialization of any particular audit module 244, 246, and the security diagnostic tests to be performed, is preferably predefined in terms of the various script languages anticipated to be involved, expected significant combinations or values of the supplementary aspect information, and the Web page frameworks and other organizational patterns that may be evident in, and thereby deducible from, the Web page content as retrieved from a Web site. The operation of the audit modules 244, 246 is preferably also driven by an evaluation of the audit rules 92 to further define specific tests that are to be run against the Web page component. The end result of these tests is preferably an identification and characterization of the security exposures represented by the Web page component.

Referring again to FIG. 8, a non-match 212 of the root-level hash value is preferably understood to indicate that some portion of the Web page content has not been audited. The DOM tree instance is reduced to auditable components 214 and selectively submitted to the audit processor 240 for exposure analysis 216. In particular, the hash values of auditable components are also checked against the persisted records of previously audited Web components. Where a match is found, a record entry is made 218 assigning the security exposures of the matched component the instance Web component. Auditing of this Web component is otherwise skipped. Where no hash value match is found, the Web component is fully processed by the audit processor 240. As the exposure analysis is completed for the unmatched Web components, record entries are made 218 to store the hash value of the Web component, the identified and characterized security exposures, and other information useful in identifying the Web page and component for correction.

Figure 10:
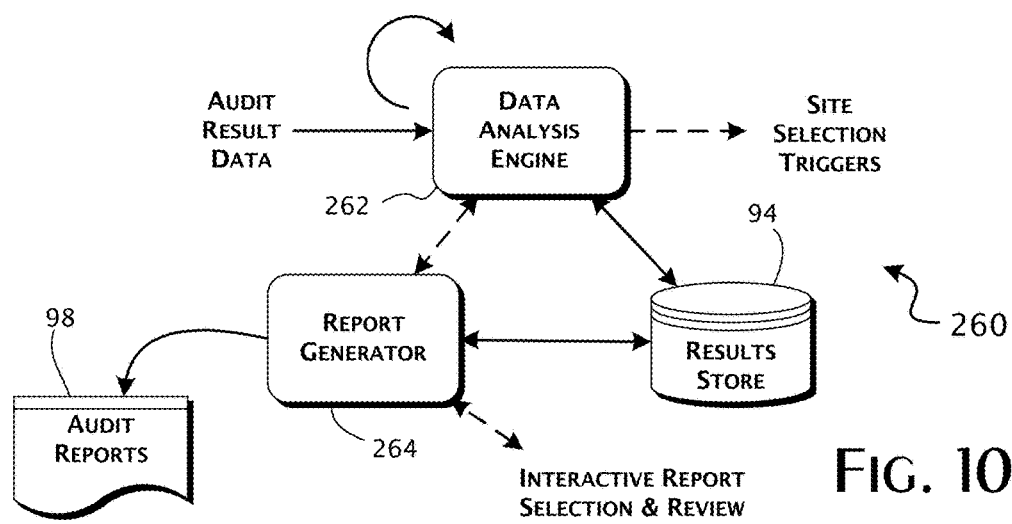
FIG. 10 is a block diagram of a reporting computer subsystem as implemented in a preferred embodiment of the present invention.

A preferred implementation of a reporting processor 260 is shown in FIG. 10. A data analysis engine 262 preferably operates to process audit result data received either directly from the audit engine 242 or as retrieved from the results store 94. Preferably, the data analysis engine 262 executes in response to automated status notifications indicating that an audit scan of a targeted Web site has completed. The audit result data is accessed from the results store 94 by the data analysis engine 262 for statistical analysis and recommendation generation. A report generator 264 executes under the control of the data analysis engine 262 to produce audit reports 98 that may then be administratively reviewed and forwarded to the corresponding domain entity.

Thus, an efficient security auditing platform and methods for ensuring that security exposures in a target Web site are identified and characterized before they may be exploited has been described. Alternate and extended embodiments of the present invention are contemplated.

One such alternate embodiment provides for an improvement in the recognition of certain Web page components. For this embodiment, the DOM differencing engine 172 operates to take into account subtle differences between certain Web page components. In particular, form components are considered in greater detail in generation of hash values. Nominally, the presently preferred embodiments may consider a form component present on two different Web pages to have the same defined uniqueness where they share the same number and type of child elements, and where the number of attributes on each of the elements also match. In practice, however, operationally different behaviors may be associated with the forms. Thus, while the form elements are near structurally identical, the identity and character of the security exposures can differ as a result of the applicable behaviors. For example, a login form with a username and a password field may be mis-identified as matching a registration form with a username and password field.

For this alternative, in addition to the existing computation and assignment of hash values to the DOM tree elements, the DOM differencing engine 172 directs a second pass review of the Web page for the purpose of identifying form components, identified by the HTML '<form>' identifier in the DOM tree. For each form found, an additional hash value is generated from a string representing a concatenation of the name of the form and the name of each input field in the form. For example, a form Web component may be represented as:

```
<form name="login" action="/login.php">
    Username: <input type="text" name="username" />
    Password: <input type="password" name="password" />
        <input type="submit" value="Login!" />
</form>
```

The additional hash value computed for this form therefore be based on the clear text string "login|username|password". Every form found on a Web page is initially treated in this manner. To handle the occurrence of the same form multiple times on the same Web page, only one instance of the otherwise duplicative hash values is maintained. Once each substantially different form on a Web page has been associated with the additional hash value, the Web page root hash value is recalculated using the following formula:

Updated root Web page hash value =

HASH(initial page hash| mark of form 1| mark of form 2| ... | mark of last form)

Thus, the DOM differencing engine 172 updates each Web page with a new hash value if the Web page contains at least one form, leading to a new set of hashes that more accurately identifies Web pages of differing structure.

Another alternate embodiment contemplated takes into consideration a repeated Web page component that represents a difference in Web page structure essentially by a difference in the number of instances. In the dynamic generation of a Web page, differences in Web page content may be represented by repeating Web components, such as in the case of comments appended to a photo-sharing Web page. These comments would each be presented in the same comment structure, and would all be treated as children of the same parent DOM tree node. While, for example, a large apparent difference will exist between a Web page with 100 comments and another with 12 comments, the actual structural difference is insignificant within the context of the present invention.

To handle this case, the DOM differencing engine 172 preferably again performs a second pass over the DOM tree to remove duplicative hash values that exist at the same level within the DOM tree. Thus, all comments, whether numbering 12 or 100, will be represented by a single hash value at the corresponding level within the DOM tree.

A further alternative is contemplated for handling Web page structures that contain a high level of nesting of DOM elements. This type of nesting may occur, for example, in a photo sharing Web site that allows users to add comments for a particular photo. Some comments may contain images, others may contain links, while others are plain text. The DOM differencing engine 172 preferably will treat each such comment as equivalent, regardless of the presence of the deeply nested content, specifically the images and links variously contained within the comments.

A DOM tree node is effectively removed from further consideration by the DOM differencing engine 172 when all of the following criteria are met:
1) The depth of the node, defined as the number of nodes between the current node and the DOM root node, is above a fixed minimum threshold.
2) The depth of the node is above a variable minimum threshold defined for the Web page. A possible implementation could calculate this threshold number as an integer fraction of the maximum depth of the DOM tree.
3) The node is a leaf or within a fixed small number of nodes to a leaf.

The preferred and alternate embodiments utilize a number of parameters that control or affect the performance of operational aspects of the present invention. These parameters can remain static at empirically selected values, but are not required to stay constant. In a preferred alternate embodiment, the DOM differencing engine 172 is adapted to evaluate and alter these parameters as in response to predefined goals, such as a target deduplication rate and another performance metrics. The goal seeking operation may be implemented using a machine learning system 186 with a supervised optimization strategy to guide adjustments made to the parameters. Each evaluation of a DOM by the DOM differencing engine 172 preferably represents an iteration of the machine learning system 186. In addition, multiple classification strategies may be executed in parallel, with weights applied to each classifier as the individual performances dictate. In this manner, the DOM differencing engine 172 may operate to choose one or more classifiers that represent a best fit for a given DOM under evaluation and, thereby, achieve better performance with lower false detections.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:
1. A method comprising:
  receiving information about a first web page, the information including a first plurality of structural elements of the first web page;
  generating a first Document Object Model (DOM) tree representation of the first web page based on the received information, the first DOM tree representation comprising a first plurality of nodes representing the first plurality of structural elements;
  identifying one or more auditable elements of the first web page from the first plurality of structural elements by traversing the first DOM tree representation, the one or more auditable elements being distinguishable elements of the web page that are susceptible to security exposures;
  comparing each of the one or more auditable elements to one or more other auditable elements that have been previously audited to determine auditable elements that share security exposure with at least one of the one or more auditable elements that have been previously audited;
  responsive to a first auditable element of the one or more auditable elements sharing security exposure with a second auditable element of the one or more other auditable elements, excluding the first auditable element from a subset of the one or more auditable elements; and
  performing a security audit on the subset of the one or more auditable elements.

2. The method of claim 1, further comprising:
  computing a hash value for each node corresponding to the one or more auditable elements, the hash value reflecting a defined uniqueness of the node based on a content type of the auditable element and any structural elements corresponding to nodes descendent from the node in the first DOM tree representation,
  wherein the first auditable element is determined to share security exposure with the second auditable element if their corresponding nodes have a same hash value.

3. The method of claim 2, further comprising:
  assigning, to the first auditable element, one or more security exposures determined for the second auditable element.

4. The method of claim 1, further comprising:
  determining that a plurality of the one or more auditable elements share security exposure, the plurality of auditable elements sharing a parent node in the first DOM tree representation; and
  including a single auditable element of the plurality of auditable elements in the subset.

5. The method of claim 4, wherein the plurality of auditable elements share security exposure if they have a same content type, and a same number and content type of derivative nodes to a threshold depth in the first DOM tree representation.

6. The method of claim 1, further comprising:
  receiving information about a second web page associated with a same web site of the first web page, the second web page being non-identical to the first web page, the information including a second plurality of structural elements;
  generating a second DOM tree representation of the second web page based on the received information, the second DOM tree representation comprising a second plurality of nodes representing the second plurality of structural elements of the second web page;
  determining, based on the second DOM tree representation, whether the second web page shares security exposure with the first web page; and responsive to the second web page sharing security exposure with the first web page, not performing a security audit on any auditable elements of the second web page.

7. The method of claim 6, further comprising:
computing a hash value for each of the second plurality of nodes,
wherein the second web page is determined to share security exposure with to the first web page if a hash value of a root node of the second DOM tree representation matches a hash value of a root node of the first DOM tree representation.

8. The method of claim 7, wherein each hash value reflects a structure of any nodes descendent from the node to which the hash value corresponds.

9. The method of claim 1, further comprising:
extracting one or more universal reference locators (URLs) from the first web page;
for each URL of the one or more URLs:
determining whether the URL is different from one or more other URLs in a URL queue; and
responsive to determining that the URL is different, adding the URL to the URL queue; and
requesting information about web pages for security audit purposes based on URLs in the URL queue.

10. The method of claim 1, wherein the identifying comprises:
determining, for each structural element of the first plurality of structural elements, whether a DOM element type of the structural element is included on a predetermined list of DOM element types that are susceptible to security exposures.

11. The method of claim 1, wherein the identifying comprises:
applying, to each structural element of the first plurality of structural elements, one or more selection rules to determine whether the structural element is susceptible to security exposures.

12. A non-transitory computer-readable medium comprising
instructions that when executed by a processor cause the processor to perform steps of:
receiving information about a first web page, the information including a first plurality of structural elements of the first web page;
generating a first Document Object Model (DOM) tree representation of the first web page based on the received information, the first DOM tree representation comprising a first plurality of nodes representing the first plurality of structural elements;
identifying one or more auditable elements of the first web page from the first plurality of structural elements by traversing the first DOM tree representation, the one or more auditable elements being distinguishable elements of the web page that are susceptible to security exposures;
comparing each of the one or more auditable elements to one or more other auditable elements that have been previously audited to determine auditable elements that share security exposure with at least one of the one or more auditable elements that have been previously audited;
responsive to a first auditable element of the one or more auditable elements sharing security exposure with a second auditable element of the one or more other auditable elements, excluding the first auditable element from a subset of the one or more auditable elements; and
performing a security audit on the subset of the one or more auditable elements.

13. The non-transitory computer-readable medium of claim 12, wherein the steps further comprise:
computing a hash value for each node corresponding to the one or more auditable elements, the hash value reflecting a defined uniqueness of the node based on a content type of the auditable element and any structural elements corresponding to nodes descendent from the node in the first DOM tree representation,
wherein the first auditable element is determined to be share security exposure with the second auditable element if their corresponding nodes have a same hash value.

14. The non-transitory computer-readable medium of claim 13, wherein the steps further comprise:
assigning, to the first auditable element, one or more security exposures determined for the second auditable element.

15. The non-transitory computer-readable medium of claim 12, wherein the steps further comprise:
determining that a plurality of the one or more auditable elements share security exposure, the plurality of auditable elements sharing a parent node in the first DOM tree representation; and
including a single auditable element of the plurality of auditable elements in the subset.

16. The non-transitory computer-readable medium of claim 15, wherein the plurality of auditable elements share security exposure if they have a same content type, and a same number and content type of derivative nodes to a threshold depth in the first DOM tree representation.

17. The non-transitory computer-readable medium of claim 12, wherein the steps further comprise:
receiving information about a second web page associated with a same web site of the first web page, the second web page being non-identical to the first web page, the information including a second plurality of structural elements;
generating a second DOM tree representation of the second web page based on the received information, the second DOM tree representation comprising a second plurality of nodes representing the second plurality of structural elements of the second web page;
determining, based on the second DOM tree representation, whether the second web page shares security exposure with the first web page; and
responsive to the second web page sharing security exposure with the first web page, not performing a security audit on any auditable elements of the second web page.

18. The non-transitory computer-readable medium of claim 17, wherein the steps further comprise:
computing a hash value for each of the second plurality of nodes,
wherein the second web page is determined to share security exposure with to the first web page if a hash value of a root node of the second DOM tree representation matches a hash value of a root node of the first DOM tree representation.

19. The non-transitory computer-readable medium of claim 18, wherein each hash value reflects a structure of any nodes descendent from the node to which the hash value corresponds.

20. The non-transitory computer-readable medium of claim 12, wherein the steps further comprise:
  extracting one or more universal reference locators (URLs) from the first web page;
  for each URL of the one or more URLs:
    determining whether the URL is different from one or more other URLs in a URL queue; and
    responsive to determining that the URL is different, adding the URL to the URL queue; and
  requesting information about web pages for security audit purposes based on URLs in the URL queue.

21. The non-transitory computer-readable medium of claim 12, wherein the identifying comprises:
  determining, for each structural element of the first plurality of structural elements, whether a DOM element type of the structural element is included on a predetermined list of DOM element types that are susceptible to security exposures.

22. The non-transitory computer-readable medium of claim 12, wherein the identifying comprises:
  applying, to each structural element of the first plurality of structural elements, one or more selection rules to determine whether the structural element is susceptible to security exposures.

\* \* \* \* \*